Jan. 23, 1968     E. E. FREELAND     3,364,782

MODIFIED BICYCLE GEAR SHIFT

Filed Dec. 6, 1966     4 Sheets-Sheet 1

INVENTOR.
ELMER E. FREELAND
BY
ATTORNEY

Jan. 23, 1968  E. E. FREELAND  3,364,782
MODIFIED BICYCLE GEAR SHIFT
Filed Dec. 6, 1966  4 Sheets-Sheet 2
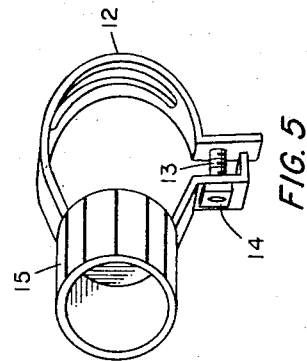
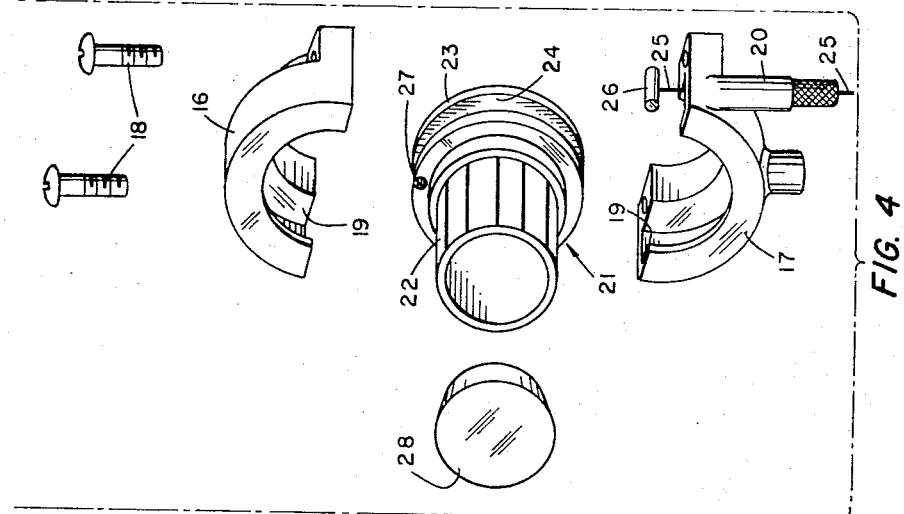
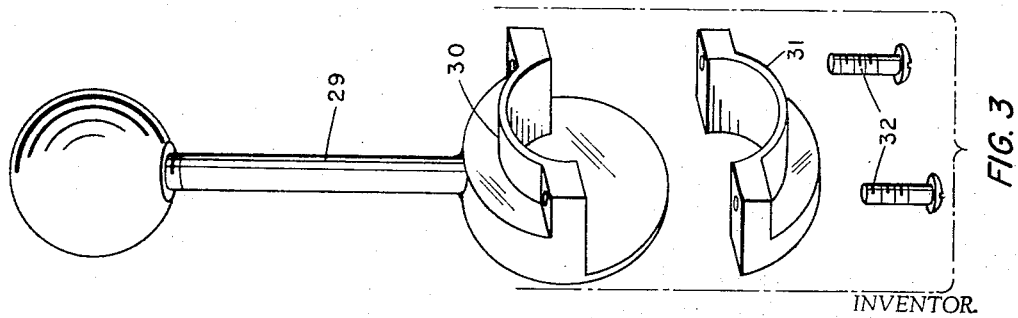
INVENTOR.
ELMER E. FREELAND
BY
ATTORNEY Jan. 23, 1968  E. E. FREELAND  3,364,782

MODIFIED BICYCLE GEAR SHIFT

Filed Dec. 6, 1966  4 Sheets-Sheet 3

INVENTOR.
ELMER E. FREELAND
BY
ATTORNEY

INVENTOR.
ELMER E. FREELAND

United States Patent Office 3,364,782
Patented Jan. 23, 1968

3,364,782
MODIFIED BICYCLE GEAR SHIFT
Elmer E. Freeland, 4500 Belle Grove Road,
Baltimore, Md. 21225
Filed Dec. 6, 1966, Ser. No. 599,581
8 Claims. (Cl. 74—501)

ABSTRACT OF THE DISCLOSURE

A bicycle gear shift combination having a cable operated multiple speed rear wheel hub, a hand speed-change lever mounted on the bicycle frame adjacent the steering head and a cable connecting the lever with the hub to operate the speed change mechanism therein, the cable passing over a resiliently mounted guide pulley to prevent undue strain on the cable and/or possible injury to the multiple speed hub, the combination being equally adaptable to both boy's and girl's bicycles.

---

The present invention relates to a gear shifting mechanism for a bicycle multiple gear transmission.

Multiple gear or multiple speed transmissions for bicycles have reached a high degree of popularity. There are a number of such devices on the market at present which are incorporated in the rear wheel hub of the cycle and which are actuated by a flexible cable from said hub to a thumb and finger control on the handle bar adjacent one of the hand grips or are operatively connected to one of the hand grips proper and activated by rotating the said hand grip.

Although in certain cases such control means are satisfactory, it has been found that as they are mounted on the handle bar, an element which must assume different angles as the vehicle is steered, they frequently stick and make gear shifting difficult, especially if they are not kept properly lubricated.

Aside from the above, it has been found that many juvenile riders prefer a gear shifting mechanism which more nearly simulates the gear shift lever of an automobile than those in common use as above mentioned.

It is accordingly one object of this invention to provide a bicycle gear shifting mechanism which can be mounted on the frame of the bicycle adjacent the head thereof for positive trouble-free operation.

It is another object to provide such a shifting device which is equally adaptable to both men's and women's types of bicycles and which can be used with numerous multi-speed hubs on the market today.

It is a still further object to provide a shifting device which more nearly resembles the gear shift lever of an automobile to attract the junior cyclists.

The above and other objects and advantages will become more apparent as this description continues, including the novel construction, combination and arrangement of parts of the device as shown in the accompanying drawings forming a part of this specification and in which, FIGURE 1 is a somewhat diagrammatic side view of a man's bicycle showing the gear shifting mechanism of this invention applied thereto.

FIGURE 3 is an exploded perspective view of the handle or shift lever proper of the mechanism.

FIGURE 4 is an exploded perspective view of a portion of the hub and mounting means for said handle or shift lever.

FIGURE 5 is a perspective view of the clamp and mounting stud for said handle.

Figure 1:
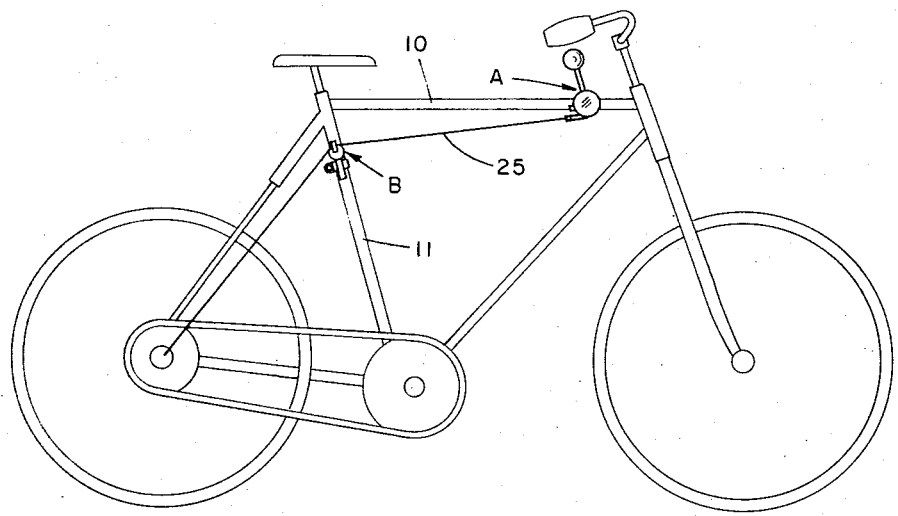
Figure 2:
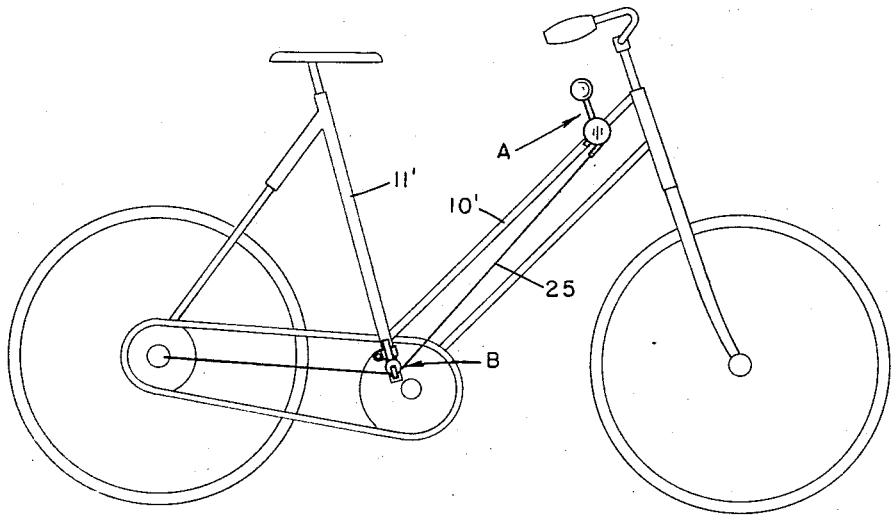
FIGURE 2 is a view similar to FIGURE 1 except the gear shifting mechanism is shown applied to a woman's bicycle.
Figure 7:
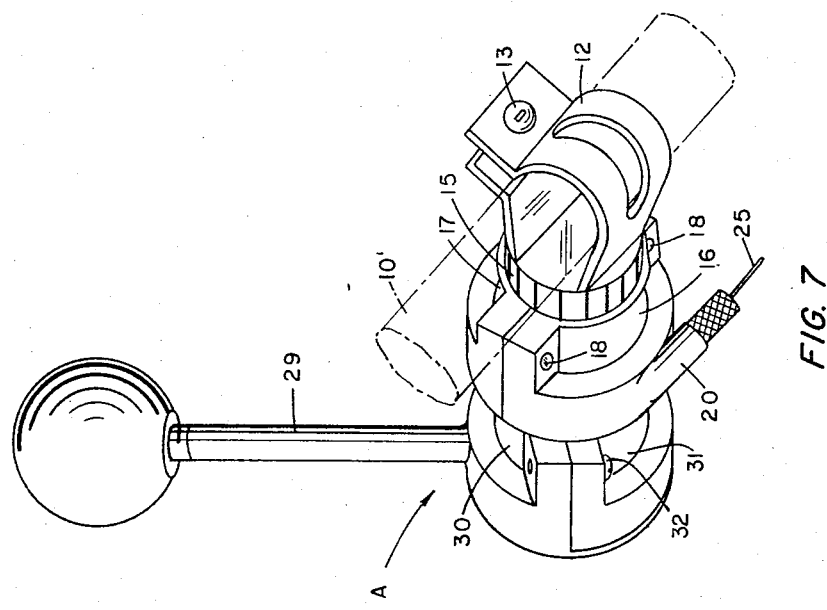
FIGURE 7 is a view similar to FIGURE 6 with the assembly mounted on a woman's bicycle.
Figure 6:
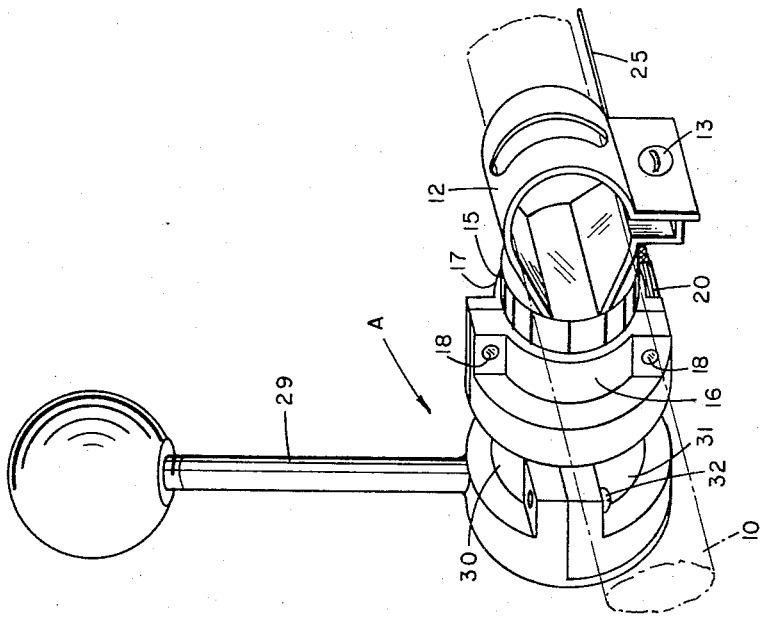
FIGURE 6 is a perspective view of the handle or shift lever assembly as it appears mounted on a man's bicycle.

Referring specifically to the drawings, the gear shifting mechanism consists of two main assemblies or units, namely, the shift lever assembly generally designated A and the guide or idler pulley assembly generally designated B. These assemblies are equally adaptable to both a man's bicycle as shown in FIGURE 2. In the former case the shift lever assembly A is mounted on the upper horizontal bar 10 near the head of the bicycle frame and the guide pulley assembly is mounted at the upper end of the substantially vertical seat supporting bar 11 as shown in FIGURE 1, while in the latter case the shift lever assembly A is mounted on the diagonal bar 10' and the guide pulley assembly is mounted on the substantially vertical seat supporting bar 11' near the lower end thereof as shown in FIGURE 2.

The shift lever assembly comprises a split mounting clamp 12 adapted to be fixedly clamped to a bar 10 or 10' of a bicycle frame by means of clamp screw 13 and nut 14. The cylindrical mounting stud 15 is integrally joined to the clamp 12 and extends at right angles thereto as shown in FIGURE 5.

Mounted on the stud 15 is a two part clamp consisting of parts 16 and 17. This two part clamp is held on the stud by means of screws 18. The clamp 16 and 17 can be adjusted angularly on the stud and then tightly clamped thereon by tightening the screws 18.

The two part clamp 16 and 17 is provided with an internal annular groove 19 as shown in FIGURE 4.

The part 17 of the two part clamp is provided with a tangentially extending tubular cable guide 20 which communicates with the internal groove 19 in the clamp.

A flanged hub generally indicated at 21 is provided with a hub portion 22 and an enlarged flanged end 23 which latter is of a size to fit within and be freely journalled in the groove 19 of the two part clamp with the hub portion 22 extending outwardly therefrom.

The enlarged flanged end 23 of the flanged hub is circumferentially grooved as shown at 24 and the tangential tubular cable guide 20 communicates therewith when the flanged end is positioned within the groove 19 of the two part clamp.

The actuating cable 25 for the multiple speed hub is brought through the cable guide 20 and is provided at its end with a cross bar 26. This bar in turn is positioned in notches 27 on each end of the hub 21 with the cable 25 located in the groove 24. It can be seen that by turning the hub 21 in a counter clockwise direction as viewed in FIGURE 4 the cable 25 will be pulled and partially wound within the groove 24.

A cap 28 may be provided for closing the open end of the flanged hub 21 to assist in retaining lubricant and excluding dirt.

To turn the hub 21 and activate the cable, a handle 29 having a two part clamp 30 and 31 is provided. The two part clamp fits the extending end of the hub portion 22 and is tightly clamped in adjusted position thereon by bolts 32.

Figure 8:
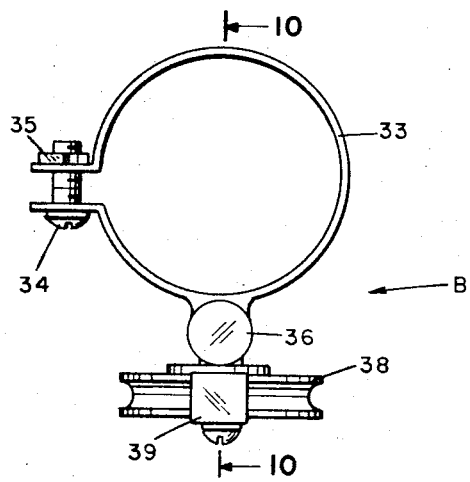
FIGURE 8 is a top plan view of the idler or guide pulley assembly for the actuating cable.
Figure 9:
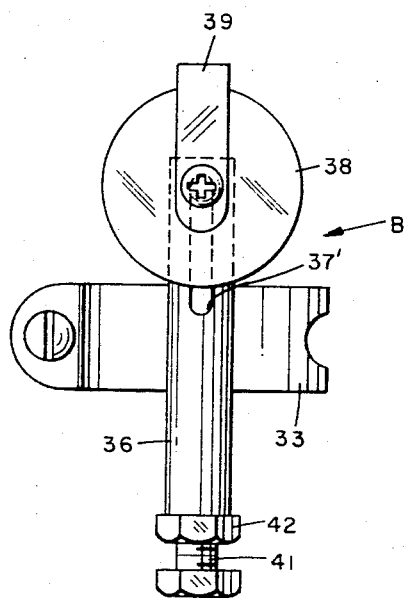
FIGURE 9 is a front elevational view of the pulley assembly shown in FIGURE 8.
Figure 10:
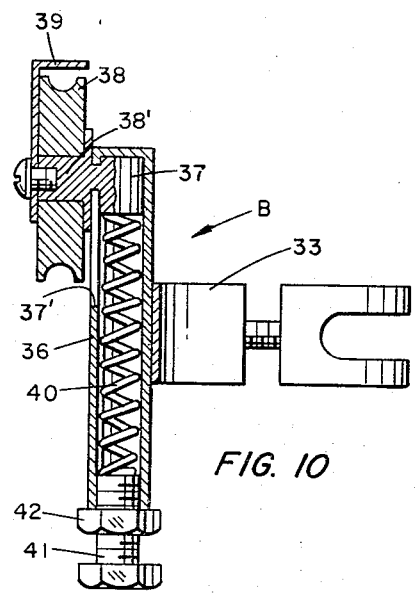
FIGURE 10 is a side elevational view partly in section of said pulley assembly.

The idler or guide pulley assembly B is shown in detail in FIGURES 8, 9 and 10 and comprises a split clamp member 33 which is adapted to clamp about a portion of the bicycle frame and be held fast thereon by means of bolt 34 and nut 35.

The clamp 33 carries a tubular member 36 and slidably mounted within this tubular member is a pulley support element 37. A pulley bearing stud 38′ attached to support element 37 extends outwardly from the tubular element 36 through slot 37′ therein and pulley 38 is journalled thereon. A cable retainer element 39 is attached to the end of stud 38′ and not only prevents the cable from becoming dislodged from the pulley but forms a retainer for the pulley on the bearing stud.

The spring 40 within the tubular element forms a resilient support for the pulley and bolt 41 and nut 42 are provided to adjust the tension on the spring and thus on the cable through the pulley.

FIGURE 1 of the drawing shows the gear shifting mechanism applied to a man's bicycle. The shift lever assembly A in this instance is clamped to the upper horizontal bar 10 of the bicycle frame and the split clamp 16, 17 is first adjusted on the cylindrical mounting stud 15 so as to point the tubular cable guide 20 toward the idler pulley 38 which is mounted near the upper end of the substantially vertical bar 11 of the bicycle frame. The split clamp 16, 17 is then tightened to hold this adjustment. The shift lever 29 is adjusted to proper position and the clamp 30, 31 on the lever is then tightly clamped on hub portion 22 of the flanged hub 21. With the cable properly anchored at its end 26 to the notches 27 in the flanged hub and directed over the pulley 38 and into the hub of the bicycle it is evident that operating the lever 29 will actuate the gear shifting means in the hub.

The spring 40 in the idler or guide pulley assembly not only provides a resilient support for the pulley to take up slack in the cable 25 but minimizes the possibility of breaking the cable in the event too great a pressure is applied to the shift lever 29. In addition, in some cable operated gear shift hubs, shifting cannot be accomplished while pedaling the bicycle and if shifting is attempted at such time injury to the gear shift hub or breakage of the cable may result. With the resiliently mounted pulley, however, if shifting is attempted while pedaling it will merely compress the spring 40 and no damage or breakage will result. Furthermore, if such shifting is done while pedaling the shift will be completed upon relaxing of pedaling effort by the spring 40 returning to its normal position.

Application of the gear shifting mechanism to a woman's bicycle is similar to that described above for the man's bicycle except the shift lever assembly A is clamped to the diagonally extending bar 10′ near the upper end thereof and the idler pulley assembly is clamped near the lever end of the substantially vertical bar 11′ of the bicycle frame. Initial adjustments similar to those described for the man's bicycle are then made. The idler pulley assembly however is reversed in this instance for obvious reasons.

Having thus described a preferred embodiment of my invention I do not wish to be limited specifically thereto but desire to include all reasonable modifications and variations thereof to the extent permitted by the prior art and as defined in the following claims.

I claim:

1. In combination with a bicycle having a main frame, front and rear wheels carried by said frame and a cable operated multiple gear hub for said rear wheel, a gear shifting mechanism for said multiple gear hub, said gear shifting mechanism comprising:

a shift lever unit mounted on said frame including a pivoted shift lever, a rotatable guide pulley, means mounting said guide pulley on said frame for resiliently-resisted rectilinear movement transverse to the axis of rotation of said pulley, a cable extending from said multiple gear hub and passing over said pulley and operatively connected to said shift lever, the portion of the cable extending between said hub and said pulley defining an angle of less than 180° with the portion of the cable extending between said pulley and said shift lever, and the mounting means for said pulley being so arranged that the resiliently resisted rectilinear movement permitted thereby will be along a line lying within said angle, whereby excessive tension placed on the cable by said shift lever will cause resiliently resisted movement of the pulley along said line.

2. The structure defined in claim 1 in which the angle defined by the two portions of the cable diverges downwardly.

3. The structure defined in claim 1 in which the angle between the two portions of the cable diverges upwardly.

4. The structure defined in claim 1 in which the shift lever unit comprises:

a clamp providing the mounting of said shift lever unit on said frame, a cylindrical stud extending from said clamp, a two-part clamp adjustably mounted on said cylindrical stud and having an internal annular groove therein, a flanged hub member, the flange of which is rotatably journalled within the annular groove in the two-part clamp, a shift lever adjustably clamped to said hub member, a hollow cable guide extending outwardly from two part clamp, said cable slidably guided therethrough, and means on the flange of said hub for attaching the end of the cable extending through said guide and forming the operative connection between said cable and said shift lever.

5. The structure defined in claim 1 in which said mounting means for said guide pulley comprises:

a clamp providing the mounting means for said guide pulley on said frame, a cylindrical housing fixed to said clamp, said housing having a guide slot in one side thereof, a pulley support member slidably mounted in said housing and having a pulley journal extending outwardly therefrom through said guide slot and rotatably supporting the guide pulley thereon, a spring within said housing and engaging said pulley support member and resiliently urging the same in one direction, and an adjustable screw threaded in said housing abutting said spring to adjust the spring force on said pulley support member.

6. The structure defined in claim 4 in which said mounting means for said guide pulley comprises:

a clamp providing the mounting means for said guide pulley on said frame, a cylindrical housing fixed to said clamp, said housing having a guide slot in one side thereof, a pulley support member slidably mounted in said housing and having a pulley journal extending outwardly therefrom through said guide slot and rotatably supporting the guide pulley thereon, a spring within said housing and engaging said pulley support member and resiliently urging the same in one direction, and an adjustable screw threaded in said housing abutting said spring to adjust the spring force on said pulley support member.

7. A gear shift lever unit for bicycle comprising:

a clamp member for mounting the unit on a bicycle frame, a cylindrical stud extending from said clamp, a two-part clamp adjustably mounted on said cylindrical stud and having an internal annular groove therein, a flanged hub member, the flange of which is rotatably journalled within the annular groove in the two-part clamp, a shift lever adjustably clamped to said hub member, a hollow cable guide extending outwardly from said two-part clamp and communicating with the internal annular groove therein, and means on said flange for connecting the end of a cable thereto.

8. A resiliently mounted guide pulley for cable operated bicycle gear shifting mechanism comprising,
a clamp for mounting the device to a bicycle frame,
a cylindrical housing fixed to said clamp,
said housing having a guide slot in one side thereof,
a pulley support member slidably mounted in said housing and having a pulley journal extending outwardly therefrom through said guide slot and rotatably supporting the guide pulley thereon,
a spring within said housing and engaging said pulley support member and resiliently urging the same in one direction, and
an adjustable screw threaded in said housing abutting said spring to adjust the spring force on said pulley support member.

References Cited

UNITED STATES PATENTS

| | | | |
|---|---|---|---|
| 55,344 | 6/1866 | Nell | 74—242.11 |
| 674,745 | 5/1901 | Sponsel | 74—488 X |
| 698,132 | 4/1902 | Palmer | 74—781 |
| 2,014,397 | 9/1935 | Smith | 74—242.11 |
| 2,341,273 | 2/1944 | Helberg | 74—501.5 |
| 2,825,246 | 3/1958 | Richards | 74—781 |
| 3,059,906 | 10/1962 | Powell et al. | |

FOREIGN PATENTS

| | | |
|---|---|---|
| 530,062 | 12/1940 | Great Britain. |
| 750,478 | 6/1956 | Great Britain. |

MILTON KAUFMAN, *Primary Examiner.*

FRED C. MATTERN, *Examiner.*

C. F. GREEN, *Assistant Examiner.*